United States Patent [19]

Brown

[11] Patent Number: 4,827,564
[45] Date of Patent: May 9, 1989

[54] WHEEL CASTER FRAME

[75] Inventor: William J. Brown, St. Louis County, Mo.

[73] Assignee: Emerson Electric Co., St. Louis, Mo.

[21] Appl. No.: 232,277

[22] Filed: Aug. 15, 1988

[51] Int. Cl.⁴ .............................................. B60B 33/00
[52] U.S. Cl. .................................... 16/18 R; 15/323; 16/31 R; 16/37; 242/85.1
[58] Field of Search ..................... 16/18 CG, 31 R, 37, 16/38, 39, 42 T; 15/323; 242/85.1

[56] References Cited

U.S. PATENT DOCUMENTS

| | | | |
|---|---|---|---|
| 2,332,208 | 10/1943 | Dow ....................................... | 15/323 |
| 3,159,862 | 12/1964 | MacFarland ........................... | 15/323 |
| 4,426,857 | 1/1984 | Epstein .............................. | 15/323 X |
| 4,658,465 | 4/1987 | Keane et al. .................... | 242/85.1 X |

Primary Examiner—Fred Silverberg
Attorney, Agent, or Firm—Polster, Polster and Lucchesi

[57] ABSTRACT

A wheel caster frame for use in a wet/dry utility vacuum cleaner drum is disclosed. The wheel caster frame is an integral one-piece molded body which is constructed for complementary mounting relative to the bottom and curved outer side walls of the drum, for close fitting and underlying support of the caster wheel frame relative to the drum. The caster wheel frame further includes an upper wall surface having a pair of concentric cylindrical wall sections extending generally vertically upwardly therefrom for releasably receiving and storing vacuum cleaner wands and tubular attachments proximate to the wet/dry utility vacuum cleaner drum.

10 Claims, 2 Drawing Sheets

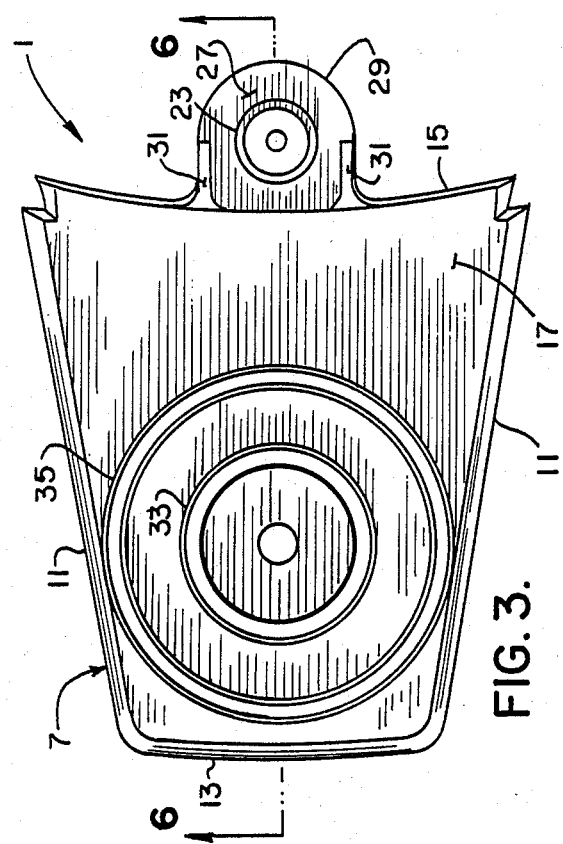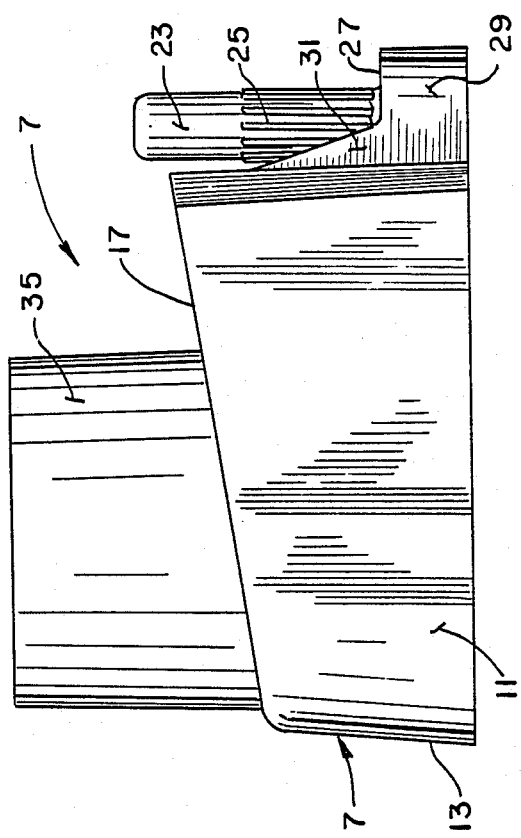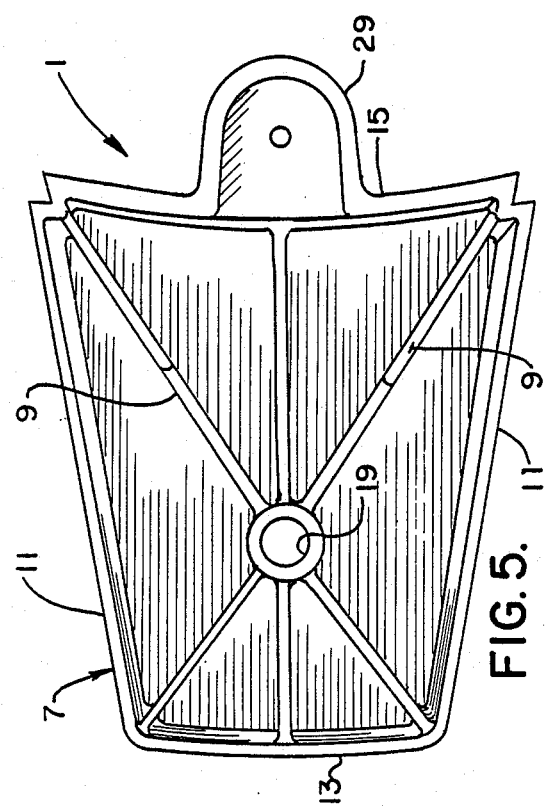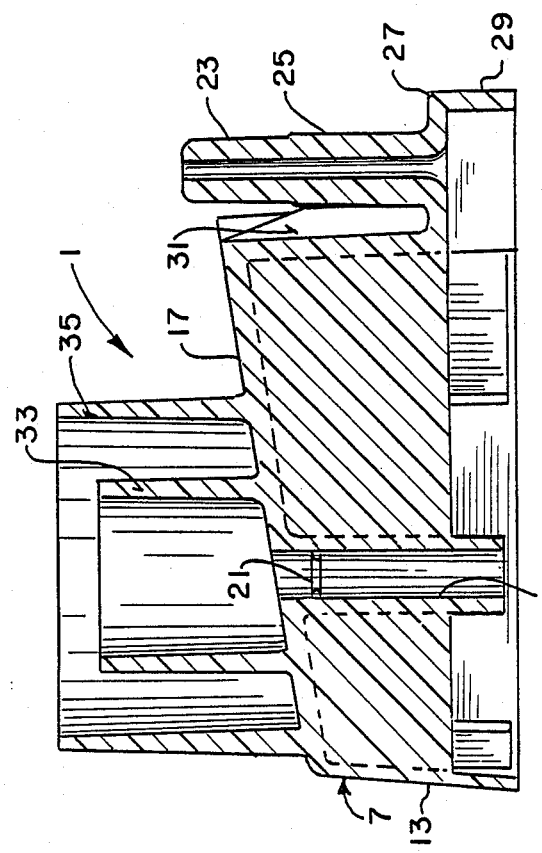

WHEEL CASTER FRAME

BACKGROUND OF THE INVENTION

The present invention relates to wheel caster frames, and more particularly, to wheel caster frames for use in conjunction with wet/dry utility vacuum cleaner drums.

Caster wheels, with and without locking brakes, are used in a variety of home appliances and office furniture. Typical caster wheels are capable of being mounted in complementary openings of such appliances and furniture to provide the flexibility of rolling movement for moving and/or re-positioning the appliances and furniture as desired.

Where caster wheels are used with wet/dry utility vacuum cleaners having large drum-type containers, caster wheel frames are employed to provide the necessary structural mounting and support required. In such cases, caster wheel frames are mounted along the bottom wall of the drum-type containers and are constructed to receive caster wheels to provide movement and/or re-positioning of the drum-type containers to the location desired. Caster wheel frames must readily support caster wheels while also being supported by the drum, to provide a strong and durable caster wheel mounting, facilitating movement and/or re-positioning of the drum, as desired.

A seemingly unrelated problem concerns the storage of vacuum cleaner hose, wands and other tubular attachments which are used in conjunction with wet/dry utility vacuum cleaner drums. As disclosed in copending patent application Ser. No. 215,719 filed July 5, 1988 of Jeffrey L. Young entitled HOSE CLIP FOR FLEXIBLE HOSE, a new and improved hose clip has been developed for clipping and retaining flexible vacuum cleaner hose relative to the drum-type container. A similar problem exists with respect to wands and other tubular attachments which are used with the flexible vacuum cleaner hose, and yet, no practical solution has been advanced to enable the wands and other tubular attachments to be stored in proximate location relative to wet/dry utility vacuum cleaner drums.

SUMMARY OF THE INVENTION

Among the several objects and advantages of the present invention may be noted:

the provision of a new and improved caster wheel frame for use in conjunction with wet/dry utility vacuum cleaner drums and the like;

the provision of the aforementioned caster wheel frame for storage of vacuum cleaner wands and other attachments used with wet/dry utility vacuum cleaner drums and vacuum hose;

the provision of the aforementioned caster wheel frame including concentric cylindrical sections for individual and/or simultaneous storage of vacuum cleaner wands and other tubular attachments of different size, one within the other, if desired;

the provision of the aforementioned caster wheel frame which is both bottom wall and side wall supported relative to the drum of a wet/dry utility vacuum drum;

the provision of the aforementioned caster wheel frame which includes an integral one-piece molded body having fastener and supporting areas relative to the bottom and lower side walls of a drum-type container, a caster wheel support, and concentric cylindrical sections for releasably receiving and storing vacuum cleaner tubular attachments proximate to a wet/dry utility vacuum cleaner drum; and the provision of the aforementioned caster wheel frame which also provides: strong and rigid structural support for the drum-type container, is durable and long lasting, is readily and economically molded as a one-piece body, and is otherwise well adapted for the purposes intended.

Briefly stated, the wheel caster frame of the present invention is capable of being used in a wet/dry utility vacuum cleaner drum or the like. The wheel caster frame is constructed as an integral one-piece molded body. A generally vertically extending channel is provided in the wheel caster frame for receiving and mounting a caster wheel shaft and associated caster wheel. An upwardly extending male post is positioned for complementary association relative to a corresponding bottom opening in the wet/dry utility vacuum cleaner drum. The wheel caster frame includes at least one cylindrical section extending upwardly from the wheel caster frame which is positioned to releasably receive and store a vacuum cleaner tubular attachment proximate to the wet/dry utility vacuum cleaner drum.

A wheel caster frame may be provided with a pair of inner and outer concentric cylindrical sections extending upwardly from the wheel caster frame for individual or simultaneous storage of vacuum cleaner tubular attachments, one within the other. The concentric cylindrical sections are preferably provided on a downwardly and outwardly extending upper surface of the wheel caster frame.

In addition to the upwardly extending male post, the wheel caster frame may further include a curvilinear wall surface spaced from and generally co-planar with the male post for engagement with an outer drum wall surface when the male post is received within the corresponding bottom opening in the drum. The male post is preferably integrally connected and supported by a pair of generally vertically extending structural rib elements which extend from the curvilinear wall surface on opposite sides of the male post and are joined to a bottom supporting wall also attached to the curvilinear wall surface, with the male post being integrally connected to and extending upwardly from the bottom supporting wall. The generally vertically extending structural rib elements may taper downwardly toward the bottom supporting wall for interconnection to a vertically extending curved wall surrounding the bottom supporting wall and being interconnected to the curvilinear wall surface. The male post also preferably includes circumferentially spaced upstanding fins for deformable and/or interfering engagement with the corresponding bottom opening.

These and other objects and advantages of the present invention will become apparent from the ensuing description.

BRIEF DESCRIPTION OF THE DRAWINGS

FIG. 3 is a top plan view of the wheel caster frame of the present invention;

FIG. 4 is a side elevational view of the wheel caster frame of the present invention;

FIG. 5 is a bottom plan view of the wheel caster frame of the present invention; and FIG. 6 is a vertical sectional view of the wheel caster frame as viewed along lines 6—6 of FIG. 3.

Corresponding reference numerals will be used throughout the various figures of the drawings.

DESCRIPTION OF THE PREFERRED EMBODIMENTS

As shown in FIGS. 1-6 of the drawings, the caster wheel frame 1 of the present invention is constructed primarily for use in conjunction with a wet/dry utility vacuum cleaner having a large drum-type container, although it is conceivable that other possible uses of the wheel caster frame 1 of the present invention are possible.

Figure 1:
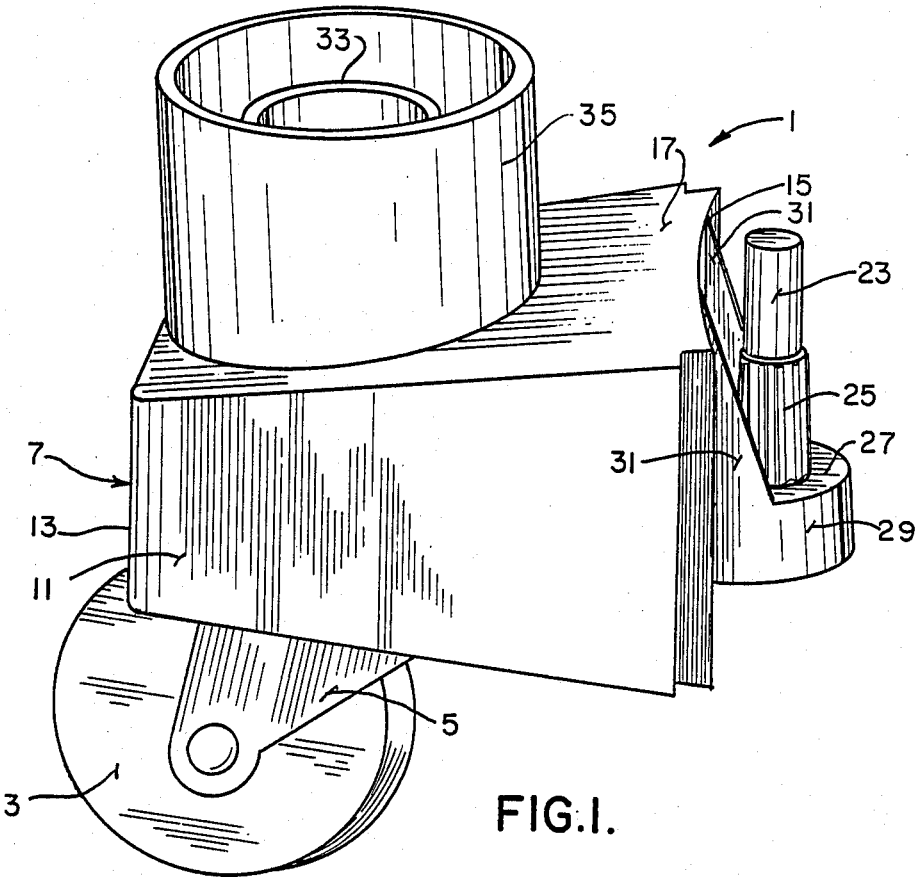
FIG. 1 is an isometric view of the wheel caster frame which is constructed in accordance with the teachings of the present invention, together with a caster wheel mounted with respect thereto.
Figure 2:
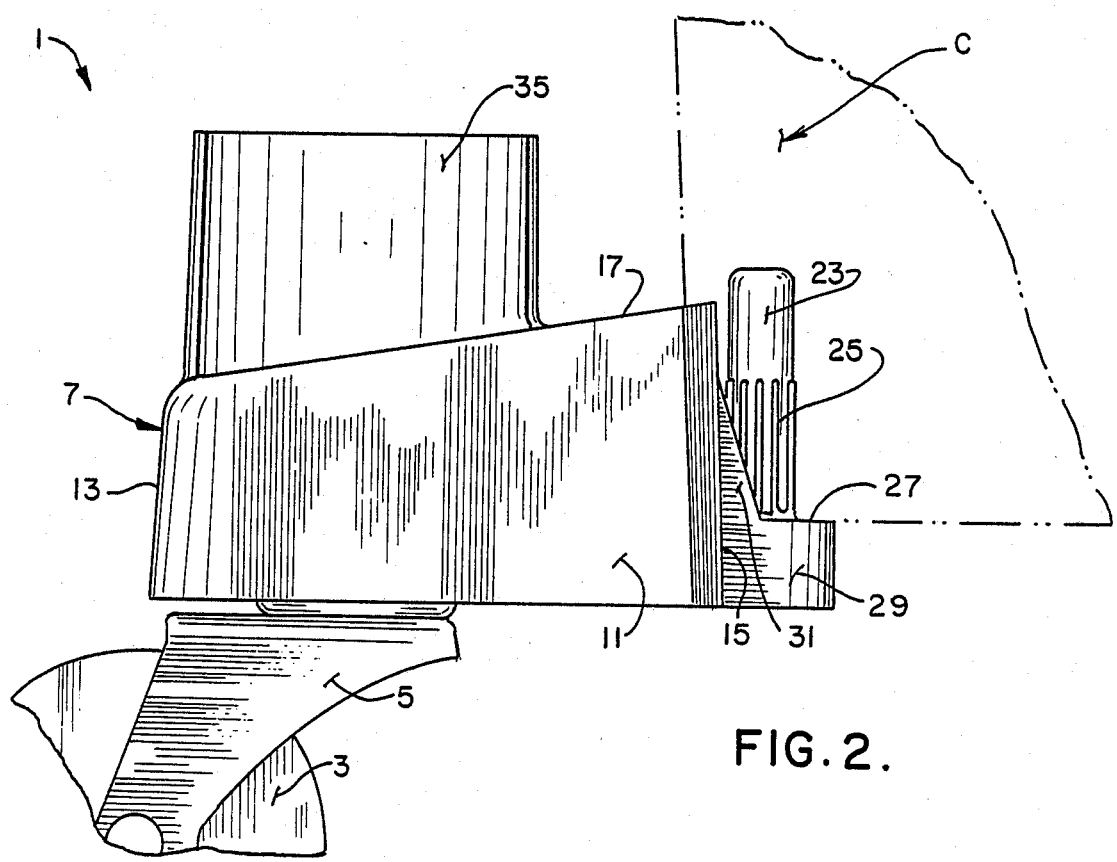
FIG. 2 is a side elevational view of the wheel caster frame illustrated in FIG. 1, and showing in dotted lines the bottom and side wall areas of a drum-type container with which the wheel caster frame of the present invention may be associated.

The wheel caster frame 1 is shown in FIGS. 1-2 of the drawing as receiving and mounting a caster wheel 3. Conventional caster wheels, of the type illustrated in the drawings, include the wheel 3 and a pivotally mounted U-shaped frame 5 from which a generally vertically upwardly extending caster wheel shaft (not shown) extends. As will be apparent from the discussion that follows, the caster wheel shaft may be received and mounted within the caster wheel frame 1, as will become apparent.

The caster wheel frame 1 is preferably formed as an integral one-piece molded element or body. Preferably, the material from which the molded body is formed is a medium impact polypropylene-copolymer, in order to facilitate the molding of the complex shapes of the wheel caster frame 1, while retaining efficient strength, rigidity and durability.

The caster wheel frame 1 includes a hollow polygonally-shaped body body 7 which is structurally supported by a series of interconnected reinforcing struts 9 extending across the hollow interior of the hollow polygonally shaped body 7. While there is no bottom wall for the hollow polygonally-shaped body 7, there are a pair of generally vertically directed, angularly inclined side walls 11, 11 on opposite side of the hollow polygonally-shaped body 7. At one end of the hollow polygonally-shaped body 7, a generally vertically directed end wall 13 interconnects the generally vertically directed, angularly inclined side walls 11. A curvilinear end wall surface 15 interconnects the side walls 11, 11 at an opposite end from the generally vertically directed end wall surface 13. For purposes which will subsequently appear, the curvilinear wall surface 15 is complementary shaped relative to an outer drum wall surface.

Interconnecting all of the aforementioned side and end walls surfaces of the hollow polygonally-shaped body 7 is an upper wall surface 17 which, when the wheel caster frame 1 is mounted to a drum-type container as shown in FIG. 2, slopes downwardly and outwardly away from the drum-type container, generally identified as C in FIG. 2 of the drawings.

For receiving the caster wheel shaft (not shown) and associated caster wheel 3, the caster wheel frame 1 in the hollow polygonally-shaped body 7 includes a generally vertically extending channel 19, as best seen in FIGS. 5-6 of the drawings. The internal dimension of the generally vertically extending channel 19 of the hollow polygonally shaped body 7 is suitably shaped and dimensioned for receiving a caster wheel shaft (not shown) in conventional manner therein. Preferably, the generally vertically extending channel 19 includes a circumferential collar section 21 (see FIG. 6) for engaging a corresponding circumferential depression (not shown) in caster wheel shafts, as is common. It will be readily understood that a caster wheel shaft (not shown), of an associated caster wheel 3, may be mounted within the generally vertically extending channel 19 formed in the hollow polygonally shaped body 7 of the wheel caster frame 1.

In order to provide a structurally stable and rigid mounting of the wheel caster frame 1 relative to the drum type container C shown in FIG. 2 of the drawings, the wheel caster frame 1 includes an integral upwardly extending male post 23 which is positioned for complementary association relative to a corresponding bottom opening (not shown) in the drum-type container C. The upwardly extending male post 23 may be provided with a series of circumferentially spaced upstanding ribs 25 for deformable and/or interfering engagement with the internal wall surface of the bottom opening of the drum-type container C.

The integral upwardly extending male post 23 extends upwardly from a bottom supporting wall 27 which is integrally connected to the curvilinear end wall surface 15 of the hollow polygonally shaped body 7. A bottom supporting wall 27 is interconnected relative to a generally vertically extending curved wall 29 which surrounds the bottom supporting wall 27 and is also interconnected to the curvilinear end wall surface 15 of the hollow polygonally shaped body 7. Extending from an upper area of the curvilinear end wall surface 15 and tapering downwardly and outwardly toward the bottom wall surface 27 are a pair of generally vertically extending spaced structural rib elements 31, 31 which extend from the curvilinear end wall surface 15 on opposite sides of the male post 23 and are joined to the bottom supporting wall 27, as well as being in general co-planar integral alignment with the vertically extending curved wall 29, along areas thereof in proximity to the curvilinear end wall surface 15, as will be apparent. The bottom wall of the drum-type container C contains suitable corresponding openings for receiving the structural rib elements 31, 31 therein, along with the male post 23, for securing the wheel caster frame 1 relative to the bottom wall of the container C.

When the male post 23 and spaced structural rib elements 31, 31 are received within corresponding and complementary shaped openings in the bottom wall (not shown) of the drum-type container C, the curvilinear end wall surface 15, which is complementary shaped to an outer wall surface of the drum-type container C, is constructed to engage the outer side wall surface of the drum-type Container C. In this way, the wheel caster frame 1 is structurally supported in a secure and stable manner relative to the bottom wall and lower outer side wall of the drum-type container C, as will now be appreciated.

As has been discussed above, until recently, there has been no suitable way of storing flexible vacuum cleaner hose relative to the drum-type container C. As disclosed in copending patent application Ser. No. 215,719 Filed July 5, 1988 in behalf of Jeffrey L. Young and entitled HOSE CLIP FOR FLEXIBLE HOSE, a hose clip has been constructed for releasably securing a flexible vacuum cleaner hose while being wrapped circumferentially about the drum-type container.

In addition to the flexible vacuum cleaner hose, tubular wands and other tubular attachments are used with the flexible vacuum cleaner hose for collecting wet and/or dry debris. According to the present invention, vacuum cleaner tube attachments may be stored proximate to the wet/dry utility vacuum cleaner drum C. For this purpose, a pair of inner and outer concentric cylindrical sections 33, 35 are provided. Both of the inner and outer concentric cylindrical sections 33, 35 extend upwardly from the downwardly and outwardly sloping upper surface 17 of the hollow polygonally shaped body 7. This allows the inner and outer concentric cylindrical sections 33, 35 to extend generally vertically upwardly from the downwardly and outwardly tapering upper surface 17, so as to provide maximum length thereof, while at the same time being incorporated as integral elements of the wheel caster frame 1. Preferably, the inner cylindrical section 33 is suitably sized and dimensioned to receive tubular accessories having a 1¼" internal dimension, whereas the outer cylindrical section 35 is suitably sized and dimensioned to receive tubular accessories having an internal diameter of 2½". If desired, both the inner and outer cylindrical sections 33, 35 may be used simultaneously since 1¼" tubular accessories may be readily received within 2½" tubular accessories, while stored within the cylindrical sections 33, 35.

It will be noted that the inner concentric cylindrical section 33 has its free end terminating short of the free end of the outer concentric cylindrical section 35, in order to eliminate any interference with a tubular accessory mounted over the outer concentric cylindrical section 35, while enabling the outer concentric cylindrical section 35 to circumferentially surround and support a tubular accessory mounted upon the inner concentric cylindrical section 33. It will further be noted that the generally vertically extending channel 19, which receives the caster wheel shaft (not shown) of the caster wheel 3, is generally centrally positioned relative to the inner and outer concentric cylindrical sections 33, 35, in order to provide a stable and secure mounting of tubular accessories, when received on the inner and outer concentric cylindrical sections 33, 35, since the caster wheel 3 will provide direct underlying support of such tubular accessories, when mounted on the concentric inner and outer cylindrical sections 33, 35.

From the foregoing, it will now be appreciated that the wheel caster frame of the present invention can be securely mounted in a stable manner relative to the bottom wall and lower outer side wall of the drum-type container, while receiving an associated caster wheel for desired movement and re-positioning, and further having a pair concentric cylindrical sections for releasably receiving and storing vacuum cleaner tubular attachments proximate to a wet/dry utility vacuum cleaner drum.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:
1. A wheel caster frame for use in a wet/dry utility vacuum cleaner drum, comprising:
   an integral one-piece molded wheel caster frame; said frame comprising:
   a generally vertically extending channel in said wheel caster frame for receiving and mounting a caster wheel shaft and associated caster wheel;
   an upwardly extending male post positioned for complementary association relative to a corresponding bottom opening in said wet/dry utility vacuum cleaner drum; and
   at least one cylindrical section extending upwardly from said wheel caster frame, spaced from the male post and positioned to releasably receive and store a vacuum cleaner tubular attachment proximate said wet/dry utility vacuum cleaner drum.

2. The wheel caster frame as defined in claim 1 and said at least one cylindrical section comprising a smaller inner and a larger outer concentric cylindrical sections extending upwardly from said wheel caster frame, each section having a free end, the smaller inner cylinder section free end terminating below the outer section free end.

3. The wheel caster frame as defined in claim 2 and including an upper surface which extends downwardly and outwardly away from said drum, and said concentric cylinder sections extending generally vertically upwardly on said downwardly and outwardly extending upper surface.

4. The wheel caster frame as defined in claim 1 and further including a curvilinear wall surface spaced from and generally co-planar with said male post, said curvilinear wall surface being complementary shaped relative to an outer drum wall surface for engagement thereof, when said male post is received within the corresponding bottom opening in said drum.

5. The wheel caster frame as defined in claim 4 wherein said male post is integrally connected and supported by a pair of generally vertically extending structural rib elements extending from said curvilinear wall surface on opposite sides of said male post and being joined to a bottom supporting wall also attached to said curvilinear wall surface, said male post being integrally connected to said bottom supporting wall.

6. The wheel caster frame as defined in claim 5 wherein said generally vertically extending structural rib elements taper downwardly toward said bottom supporting wall, and said drum includes further corresponding openings for receiving said tapering structural rib elements.

7. The wheel caster frame as defined in claim 6 and including a generally vertically extending curved wall surrounding said bottom supporting wall and being interconnected to said curvilinear wall surface and structural rib elements.

8. The wheel caster frame as define din claim 7 wherein said male post includes a plurality of circumferentially spaced upstanding fins for deformable and/or interfering engagement with said corresponding bottom opening.

9. The wheel caster frame as defined in claim 8 wherein said generally vertically extending channel in said wheel caster frame includes a circumferential collar section for engaging a corresponding circumferential depression in a caster wheel shaft of the associated caster wheel.

10. A wheel caster frame for use in a wet/dry utility vacuum cleaner drum comprising:
an integral one-piece molded wheel caster frame; said frame comprising:
a generally vertically extending channel in said wheel caster frame for receiving and mounting a caster wheel shaft and associated caster wheel;
an upwardly extending male post positioned for complementary association relative to a corresponding bottom opening in said wet/dry utility vacuum cleaner drum;
a curvilinear wall surface spaced from and generally co-planar with said male post for engaging an outer drum wall surface when said male post is received within the corresponding bottom opening in said drum;
an upper wall surface extending downwardly and outwardly away from said drum when said wheel/caster frame is mounted thereto; and
a pair of concentric cylindrical sections extending generally vertically upwardly from said upper wall surface adjacent an outermost area thereof for releasably receiving and storing vacuum cleaner attachments proximate said wet/dry utility vacuum cleaner drum.

* * * * *